April 18, 1967   C. D. BRANSON   3,314,604
DIAPHRAGM VALVE TYPE OVEN CONTROL SYSTEM
Filed Dec. 30, 1964
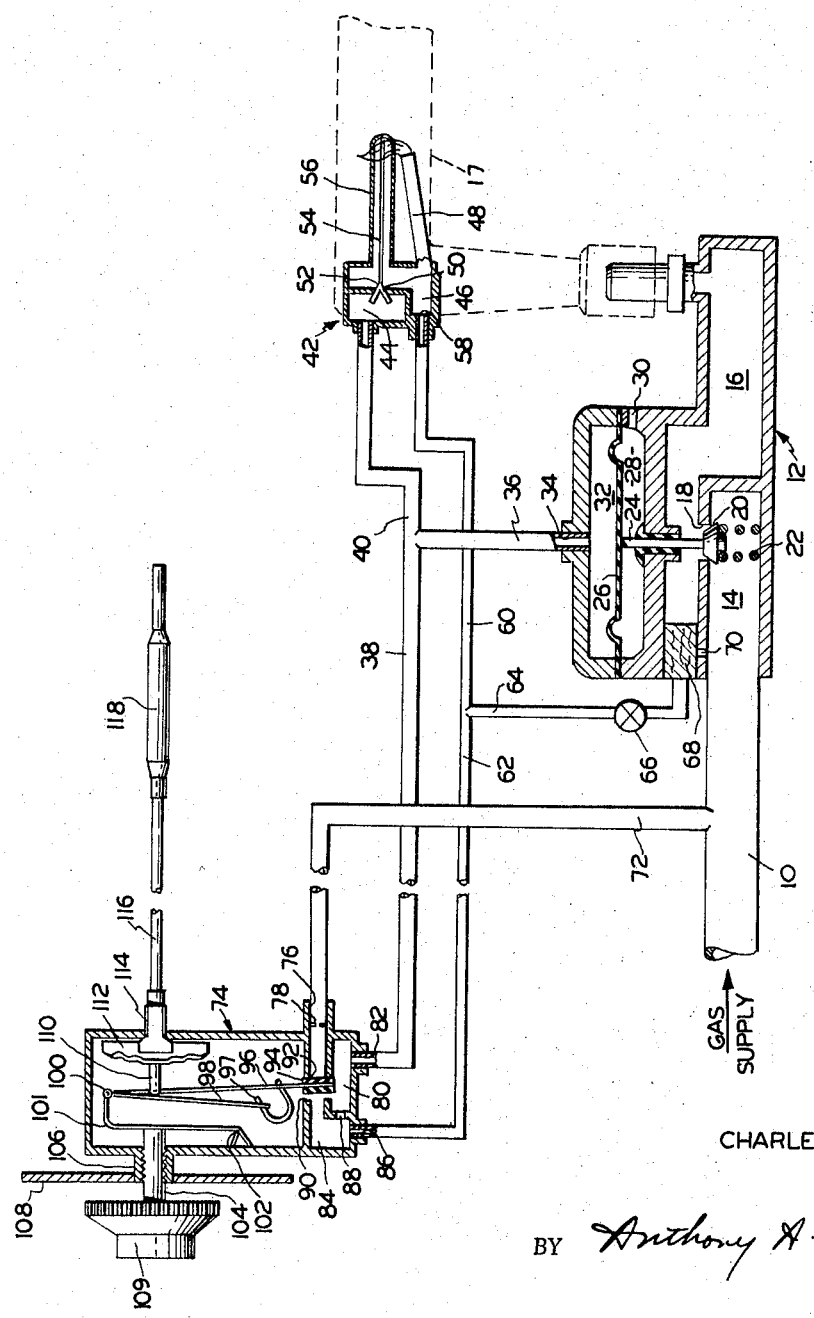
INVENTOR
CHARLES D. BRANSON
BY *Anthony H. O'Brien*
ATTORNEY

United States Patent Office 3,314,604
Patented Apr. 18, 1967

3,314,604
DIAPHRAGM VALVE TYPE OVEN CONTROL SYSTEM
Charles D. Branson, Greensburg, Pa., assignor to Robertshaw Controls Company, Richmond, Va., a corporation of Delaware
Filed Dec. 30, 1964, Ser. No. 422,136
8 Claims. (Cl. 236—80)

The present invention relates to control systems for a heating device and, in particular, to a diaphragm valve type control system for automatically controlling fuel flow to a heating oven such an as domestic gas range oven.

An object of the present invention is to supplement pilot burner fuel flow to burner apparatus in accordance with movement of a diaphragm operated fuel valve to its open position.

The present invention has another object in that pilot burner fuel flow to burner apparatus is automatically increased to an ignition flow rate whenever diaphragm operated main burner valve is opened.

Another object of this invention is to effect operation of a diaphragm valve by bleed line means including safety pilot means to vent the bleed line means in the event of pilot outage and thermostatically operated snap acting means to control the bleed line means in response to variations from a predetermined set temperature.

This invention has another object in that a diaphragm valve is pressurized to its open position so that any leakage in the pressure line assures closure of the diaphragm valve.

A further object of the present invention is to close a diaphragm operated valve in the event of breakage or leakage of external piping or control components which constitute the bleed line for effecting operation of the diaphragm operated valve.

A preferred embodiment of the present invention in a fuel flow control system includes burner apparatus having a main burner and a pilot burner for igniting the same, a control device casing having an inlet connected to a fuel supply and an outlet connected to the main burner, a diaphragm operated valve controlling a main fuel flow between the inlet and outlet, bypass flow means between the inlet and the pilot burner to establish a standby flame thereat, bleed flow means for effecting operation of the diaphragm operated valve, safety pilot means responsive to extinguishment of the flame at the pilot burner for venting the bleed flow means, thermostatically operated snap-acting control means controlling the bleed flow means for operating the diaphragm operated valve between on and off positions, and supplemental flow means between the bleed flow means and the bypass flow means and being operative when the diaphragm operated valve is moved from its off position to its on position whereby fuel in the bleed flow means supplements fuel in the bypass flow means to establish an igniting flame at the pilot burner.

Other objects and advantages of the present invention will become apparent from the following description of a preferred embodiment taken in connection with the accompanying drawing wherein the single figure is a schematic diagram with parts in section of an oven heating control system embodying the present invention.

As is illustrated in the drawing, an oven heating control system includes a main conduit 10 having one end connected to a main gas supply. A control device casing, indicated generally at 12, has an inlet passage 14 connected to the other end of main conduit 10 and an outlet passage 16 with a valve seat 1 disposed between the passages 14 and 16. The outlet passage 16 is connected by suitable fittings to a main burner 17 disposed in a cooking oven (not shown). The inlet and outlet passages 14 and 16 are separated by a valve seat 18 which is controlled by a diaphragm operated valve member 20; a coil spring 22 is mounted in compression between a wall of inlet passage 14 and the undersurface of valve member 20 for biasing the same toward the valve seat 18. The upper surface of the valve member 20 is secured to one end of a valve stem 24 that protrudes through a sealed opening in a partition in casing 12 into a diaphragm chamber; the other end of the valve stem 24 is centrally fixed to a flexible diaphragm 26.

The flexible diaphragm 26 divides the diaphragm chamber into a lower atmospheric chamber 28 vented to the atmosphere through a casing opening 30 and an upper pressure operating chamber 32 having an opening 34. A bleed pipe 36 from the opening 34 communicates with a T juncture formed by oppositely extending pipes 38 and 40. A safety pilot device, indicated generally at 42, has an inlet chamber 44 communicating with an outlet chamber 46 which leads to a pilot burner 48 disposed in igniting proximity to the main burner 48. The inlet and outlet chambers 44 and 46 are separated by a partition having an opening therein to define a bleed flow valve seat 50 which is controlled by a safety valve member 52. Operation of the safety valve member 50 is effected by a flame sensor disposed in the flame of the pilot burner; the flame sensor includes an inner red member 54 made of thermally non-expansible material, such as ceramic, and an outer tubular member 56 made of thermally expansible and contractible material, such as stainless steel. The inner end of rod 54 is fixed to the valve member 52 and the inner end of tube 56 is fixed to the housing of the safety pilot device 42; the outer ends of the rod 54 and tube 56 are integrally connected whereby expansion and contraction of the tube 56 causes the rod 54 to follow. Thus, the safety valve member 52 closes the seat 50 when a flame exists at the pilot burner 48 and opens the seat 50 upon extinguishment of such flame.

In addition to the bleed flow through the seat 50, the outlet chamber 46 receives a bypass flow through a bypass inlet port 58 which is connected to a bypass flow pipe 60. The bypass flow pipe 60 and an oppositely extending bypass flow pipe 62 define a T juncture with a perpendicularly disposed bypass flow pipe 64. The bypass flow pipe 64 includes an adjustable flow restrictor 66 and communicates with a filter cavity 68 in the casing 12; an opening 70 in a wall of casing 12 establishes communication between the inlet passage 14 and the filter cavity 68.

Upstream of the casing 12, a bleed flow pipe 72 from the main conduit 10 leads to a thermostatically operated snap-acting control device indicated generally at 74. The control device 74 includes a hollow housing having an inlet port 76 communicating with the bleed flow pipe 72 and a flow restrictor 78 in the inlet 76 provides a predetermined pressure drop for the bleed flow. The inlet 76 opens into a bleed flow chamber 80 having an outlet port 82 connected to the bleed flow pipe 38. A supplemental bypass flow chamber 84 in the control housing 74 has an outlet port 86 connected to the bypass flow pipe 62. A supplemental port 88 between the chambers 80 and 84 provides continuous communication therebetween for a purpose to be described hereinafter. An inlet valve seat 90 for the chamber 84 and an inlet valve seat 92 for the chamber 80 are in spaced alignment from each other and a double faced valve member 94 reciprocates between the seats 90 and 92 to provide alternate control of the chambers 80 and 84.

The valve member 94 is fixed on the end of an actuated blade 96 which is operated with a snap action by means of a U-shaped rolling spring 97 and an actuating blade 98. The actuated blade 96 is a rectangular strip having a central rectangular opening through which the spring 97 and blade 98 are moved; the actuating blade 98 is also rectangular with its free end terminating short of the blade 96 whereby the U-shaped spring 98 is assembled by being bowed in compression between the adjacent end portions of the blades 96 and 98. The opposite end portions of the blades 96 and 98 are integrated and attached to a movable pivot 100 on one end of an adjustable lever 101 which is pivotally mounted on its opposite end to a fixed fulcrum 102 on an inside wall of control housing 74.

Intermediate its ends, the lever 101 is engaged by one end of an adjusting shaft 104 threadedly extending through a threaded bushing 106 which defines a mounting means for attaching the control housing 74 to the mounting panel 108 of an oven. A temperature setting dial 109 is keyed to the exterior end of the shaft 104 whereby manual rotation of the dial 109 to a selected cooking temperature effects longitudinal movement of the shaft 104 to adjust the lever 101 about its fulcrum 102 to a corresponding control position. Intermediate its ends, the actuating blade 98 is engaged by the end of an operating button carried by a thermally expanding and controlling power element 112, which may be of any suitable form, such as a pair of nested flexible diaphragms. The power element 112 is secured to a wall of control housing 74 by a hollowed threaded stud 114 extending therethrough; the exterior portion of stud 114 is connected to one end of a capillary tube 116, the other end of which is connected to a thermal sensing bulb 118 suitably disposed in the oven. The power element 112, the stud 114, the capillary tube 116 and the bulb 118 constitute a closed system filled with an expansible fluid so that a variation of temperature sensed by the bulb 118 produces a corresponding expansion or contraction of the power element 112 to effect a similar movement of the actuating blade 98.

OPERATION

In order to commence operation of the above described system, the main conduit is supplied with gas as by opening a shut-off valve (not shown); a bypass flow of gas from filter cavity 68 flows through the restrictor 66, the bypass flow pipes 64 and 60, the bypass port 58 and chamber 46 to the pilot burner 48 where it is ignited as by a match. This bypass flow is adjusted by the adjustable restrictor 66 to provide the pilot burner with a standby flame which is sufficient to cause expansion of the flame sensor tube 56 so that the rod 54 moves valve member 52 to close the valve seat 50.

The temperature setting dial 109 is now rotated to a desired cooking temperature, e.g., 300° F., causing outward movement of the shaft 104 and displacement of the lever 101 and its movable pivot 100 to the left. The opposite ends of blades 96 and 98 are thus moved toward each other until the rolling spring 97 moves over-center whereupon the valve member 94 snaps from seat 92 to seat 90. A bleed flow of gas now flows from the main conduit 10 through the bleed pipe 72, the inlet 76, the restrictor 78, the valve seat 92, the chamber 80, the outlet 82, the bleed pipes 38 and 36, and the casing opening 34 into the pressure operating chamber 32; since the safety valve 52 is closed, there is no bleed flow through the bleed pipe 40 and inlet chamber 44. The bleed flow of gas from the control outlet chamber 80 also has a parallel restricted flow through the supplemental port 88, the chamber 84 and the outlet 86 to the pipe 62 whence it supplements the bypass flow of gas from pipe 64 to pipe 60 so that the size of the flame at the pilot burner 48 is increased from a standby flame to an igniting flame.

The increased pressure in the pressure operating chamber 32 causes downward movement of the diaphragm 26 against the bias of coil spring 22; the pressure in chamber 28 is adjusted to the new condition by the atmospheric vent 30. The downward movement of the diaphragm 26 effects opening of the valve member 20 whereby a main flow of gas proceeds to the main burner 17 where it is ignited by the igniting flame from the pilot burner 48.

As soon as the oven is heated to the desired temperature as sensed by the thermal bulb 118, the power element button 110 biases the actuating blade 98 until the rolling spring 97 snaps the actuated blade 96 and its valve member 94. The valve seat 90 is now opened and the valve member closes the seat 92 so that the flow from bleed pipe 72 is cut off. Opening of the valve seat 90 establishes a bleed flow from the pressure operating chamber 32 through the opening 34, the bleed pipes 36 and 38, the port 82, the chamber 80, the valve seat 90, the chamber 84, the port 86 and the pipe 62 whence it joins the bypass flow in pipe 60 leading to the pilot burner 48. Thereafter the flame at the pilot burner is reduced to a standby flame. The decreased pressure in the pressure operating chamber 32 causes closure of the valve member 20 and the flow of gas to the main burner 17 is cut off. The snap-acting control 74 will continue to cycle thermostatically in response to heat variations from the set temperature and accordingly effect cycling of the bleed flow line for operating the main diaphragm valve.

If the flame at the pilot burner 48 is extinguished, the cooled sensor tube 56 contracts and the rod 54 opens the safety valve 52. The pressure operating chamber 32 is then bled through its opening 34, bleed pipes 36 and 40, the chamber 44, the safety valve seat 50 and the outlet chamber 48 to the pilot burner 48. The decreased pressure in the pressure operating chamber 32 caused the diaphragm operated valve 20 to be closed by the bias of the coil spring 22. As long as the safety valve 52 is opened, the pressure operating chamber 32 cannot be pressurized because a bleed flow from bleed pipe 38 will be vented through the safety device 42 to the pilot burner 48.

Upon completion of the cooking operation, the temperature setting dial 109 is rotated to its off position whereby the valve 94 closes the seat 92 and prevents flow from the bleed pipe 72. The pilot burner 48 will continue with its standby flame by means of the bypass flow line so as to be ready for the next cooking operations.

In accordance with the present invention, the above arrangement provides a fail safe system permitting the use of separate components such as the diaphragm control device 12, the safety device 42 and the thermostatic control device 74. These separate components may thus be assembled onto various types of ovens and connected by exterior plumbing fixtures and piping. In the event the plumbing and piping is defective or rendered defective during installation or repair, any leakage caused thereby will not present a hazardous condition; inasmuch as the diaphragm 26 is pressurized on one side to cause main valve opening, any leakage would prevent the diaphragm 26 from being pressurized and the valve 20 would remain closed.

Inasmuch as the present invention is subject to many modifications, variations and changes in details, it is intended that all matter contained in the foregoing description of the preferred embodiment or shown on the accompanying drawing, shall be interpreted as illustrative and not in a limiting sense.

What is claimed is:

1. In a fuel flow control system, the combination comprising burner apparatus including a main burner and a pilot burner in igniting proximity thereto, a casing having inlet means adapted to be connected to a fuel supply and outlet means connected to said main burner, diaphragm operated valve means controlling a main fuel flow between said inlet and outlet means, bypass flow means between said inlet means and said pilot burner to establish a standby flame thereat, bleed flow means for effecting operation of said valve means, safety pilot means responsive to extinguishment of the flame at said pilot burner for venting said bleed flow means, thermostatically operated snap-acting control means controlling said bleed flow means for operating said valve means between on and off positions, and supplemental flow means between said bleed flow means and said bypass flow means, and being operative when said valve means is moved from its off position to its on position whereby fuel in said bleed flow means supplements fuel in said bypass flow means to establish an igniting flame at said pilot burner.

2. In a fuel flow control system, the combination comprising burner apparatus having a main burner and a pilot burner in igniting proximity thereto, a main control device including diaphragm operated valve means for controlling a fuel flow to said main burner, bypass flow means bypassing said main control device for providing a bypass fuel flow to said pilot burner whereby a standby pilot flame is established, bleed flow means providing an operating pressure for effecting operation of said diaphragm operated valve means, a thermostatically operated control device controlling said bleed flow means and the operating pressure whereby said diaphragm operated valve means is moved between on and off positions, said thermostatically operated control device including supplemental flow means for supplementing fuel flow in said bypass flow means whereby said pilot burner is provided with an igniting flame when said diaphragm operated valve means is moved to its on position, and a flame sensing safety device responsive to the flame at said pilot burner and being operatively connected to said bleed flow means for venting the same upon extinguishment of the flame at said pilot burner.

3. The combination as recited in claim 2 wherein said thermostatically operated control device includes a snap-acting mechanism and a double acting valve operated thereby, said valve having one position permitting said bleed flow means to pressurize said diaphragm operated valve means to its on position and having an alternate position permitting said bleed flow means to depressurize said diaphragm operated valve means to its off position.

4. The combination as recited in claim 3 wherein said thermostatically operated control device includes temperature setting means for moving said snap-acting mechanism to a selected temperature position and thermally responsive means for cycling said snap-acting mechanism in response to variations from the selected temperature.

5. In a fuel flow control system for cooking oven or the like, the combination comprising burner apparatus including a main burner and a pilot burner in igniting proximity thereto, a main control device casing having inlet means adapted to be connected to a fuel supply and outlet means communicating with said main burner, valve means in said casing controlling a main fuel flow therethrough, diaphragm means in said casing operatively connected to said valve means for operating the same between on and off positions, a pressure operating chamber for said diaphragm means adapted to be pressurized and depressurized for effecting operation of said valve means between on and off positions, respectively, pilot flow means bypassing said valve means and communicating with said pilot burner to establish a standby pilot flame, bleed flow means communicating with said pressure operating chamber to pressurize and depressurize the same, a thermostatic control housing having an inlet and outlet communicating with said bleed flow means and an outlet port communicating with said pilot flow means, a snap-acting valve device in said housing controlling a bleed flow therethrough and being movable between a pressurized control position wherein the bleed flow to said pressure operating chamber is permitted and a depressurizing control position wherein the bleed flow to said pressure operating chamber is prevented, supplemental port means in said housing between the outlet and the outlet port thereof whereby a portion of the bleed flow, when said valve is in a pressurizing control position, is supplied to said pilot flow means for increasing the flame at said pilot burner to an igniting flame, thermostatic means responsive to heating conditions produced by said main burner for operating said snap-acting valve, a flame failure device operatively connected to said bleed flow means downstream of said snap-acting valve and being operative in response to flame failure at said pilot burner to vent said bleed flow means whereby pressurizing of said pressure operating chamber is prevented.

6. The combination as recited in claim 5 wherein said flame failure device comprises a safety pilot device having a venting valve and a flame responsive device for maintaining said venting valve closed whenever a flame exists at said pilot burner.

7. The combination as recited in claim 6 wherein said pilot flow means comprises exterior piping means extending between the inlet means of said casing and said pilot burner and having a communicating juncture with the outlet port of said housing, and wherein said bleed flow means comprises first external piping means disposed upstream of the valve means in said casing and extending to the inlet of said housing and second external piping means extending from the outlet of said housing to said pressure operating chamber and having a communicating juncture with the venting valve of said flame failure device.

8. The combination as recited in claim 7 wherein said exterior piping means and said first external piping means are each provided with flow restricting means.

References Cited by the Examiner

UNITED STATES PATENTS

| | | | |
|---|---|---|---|
| 1,715,650 | 6/1929 | Fonseca | 158—129 |
| 2,032,046 | 2/1936 | Branche | 158—129 |
| 2,676,757 | 4/1954 | Thornbery | 236—80 |

ALDEN D. STEWART, *Primary Examiner.*